United States Patent
Smith et al.

(10) Patent No.: US 7,039,799 B2
(45) Date of Patent: May 2, 2006

(54) METHODS AND STRUCTURE FOR BIOS RECONFIGURATION

(75) Inventors: Gerald Edward Smith, Suwanee, GA (US); Russell M. Foster, Alpharetta, GA (US)

(73) Assignee: LSI Logic Corporation, Milpitas, CA (US)

( * ) Notice: Subject to any disclaimer, the term of this patent is extended or adjusted under 35 U.S.C. 154(b) by 468 days.

(21) Appl. No.: 10/285,267

(22) Filed: Oct. 31, 2002

(65) Prior Publication Data

US 2004/0088534 A1 May 6, 2004

(51) Int. Cl.
*G06F 1/24* (2006.01)
*G06F 9/24* (2006.01)

(52) U.S. Cl. .................................................... 713/100
(58) Field of Classification Search ...................... None
See application file for complete search history.

(56) References Cited

U.S. PATENT DOCUMENTS

| | | | |
|---|---|---|---|
| 6,163,801 A * | 12/2000 | O'Donnell et al. | 713/375 |
| 6,572,384 B1 * | 6/2003 | Marchevsky | 710/104 |
| 6,633,976 B1 * | 10/2003 | Stevens | 713/2 |
| 6,718,464 B1 * | 4/2004 | Cromer et al. | 713/2 |

* cited by examiner

*Primary Examiner*—Lynne H. Browne
*Assistant Examiner*—Anand B. Patel
(74) *Attorney, Agent, or Firm*—Duft Bornsen & Fishman, LLP

(57) ABSTRACT

Methods and structure for customizable BIOS in a peripheral device adapter. The controller of a peripheral device adapter senses a selection indicative of a desired customized BIOS configuration. BIOS information is updated to reflect the desired customized selection. In one embodiment, customization may be by updating portions of a default BIOS configuration with updated information stored in a selected custom BIOS information element. In another embodiment, each custom BIOS information element may store an entire snapshot of BIOS information customized for a particular application. The selected custom BIOS information may then be copied to a BIOS memory or BIOS memory accesses may be mapped to the selected custom BIOS information element.

9 Claims, 5 Drawing Sheets

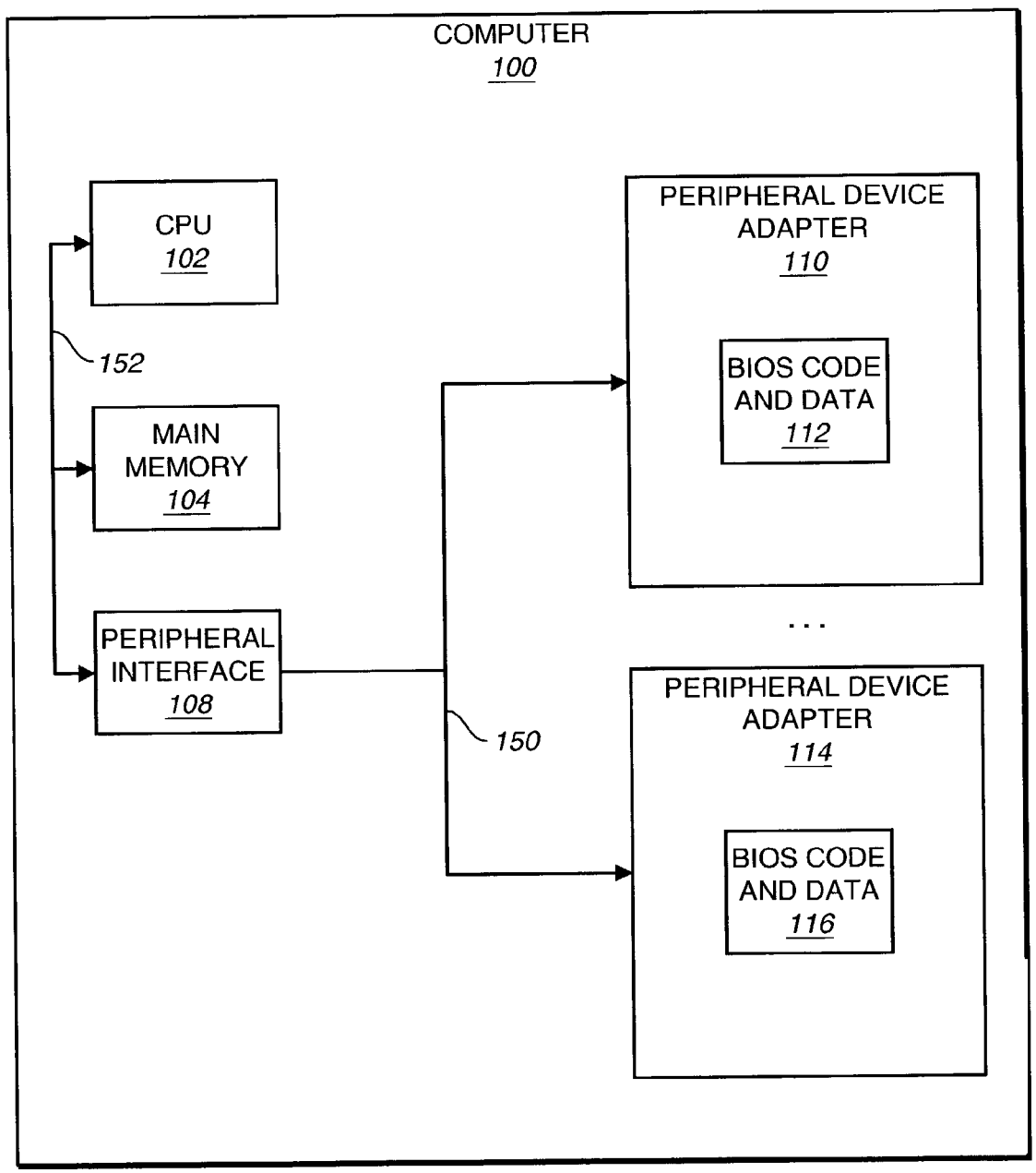
FIG._1
*(PRIOR ART)*

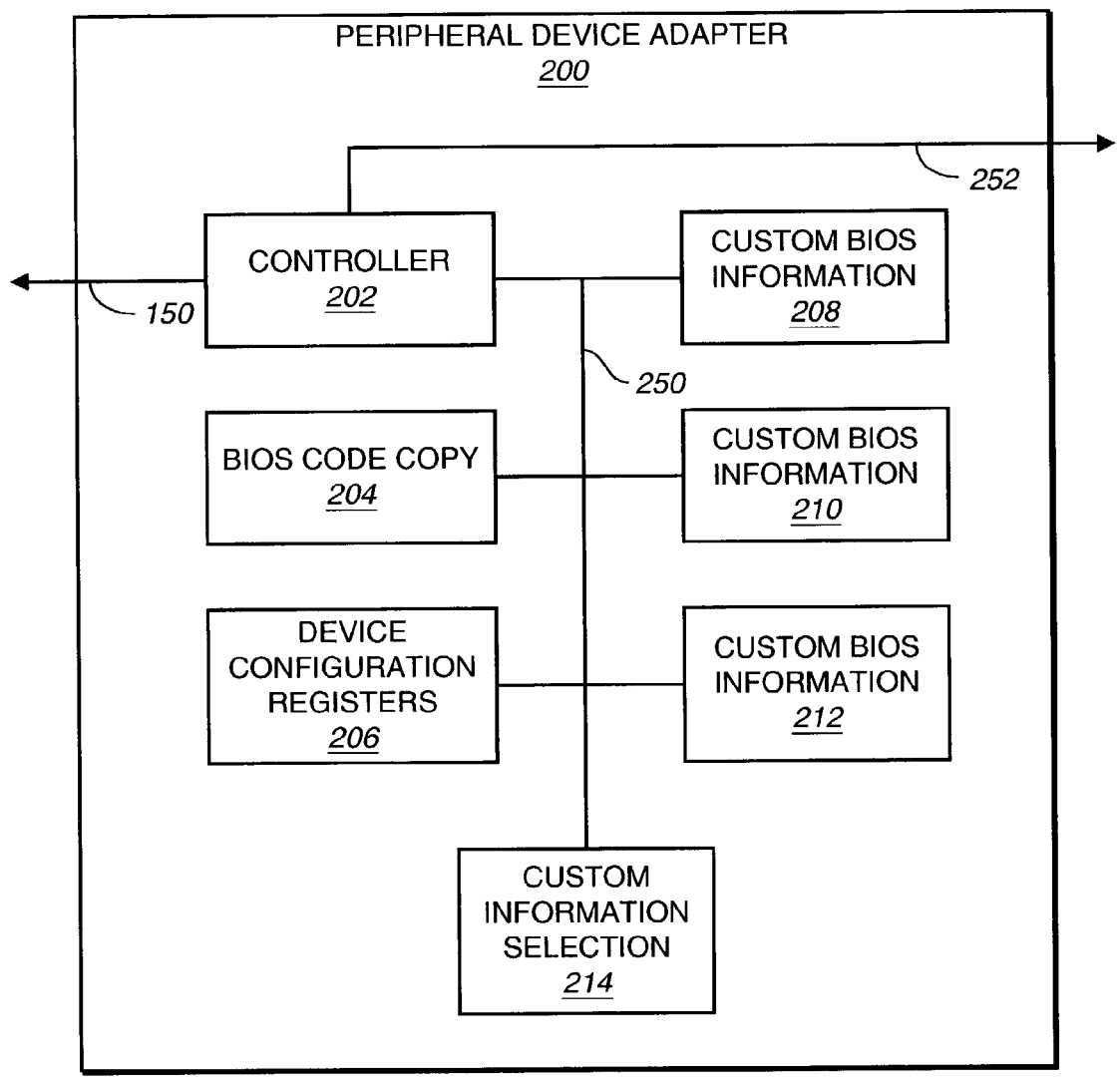
FIG._2

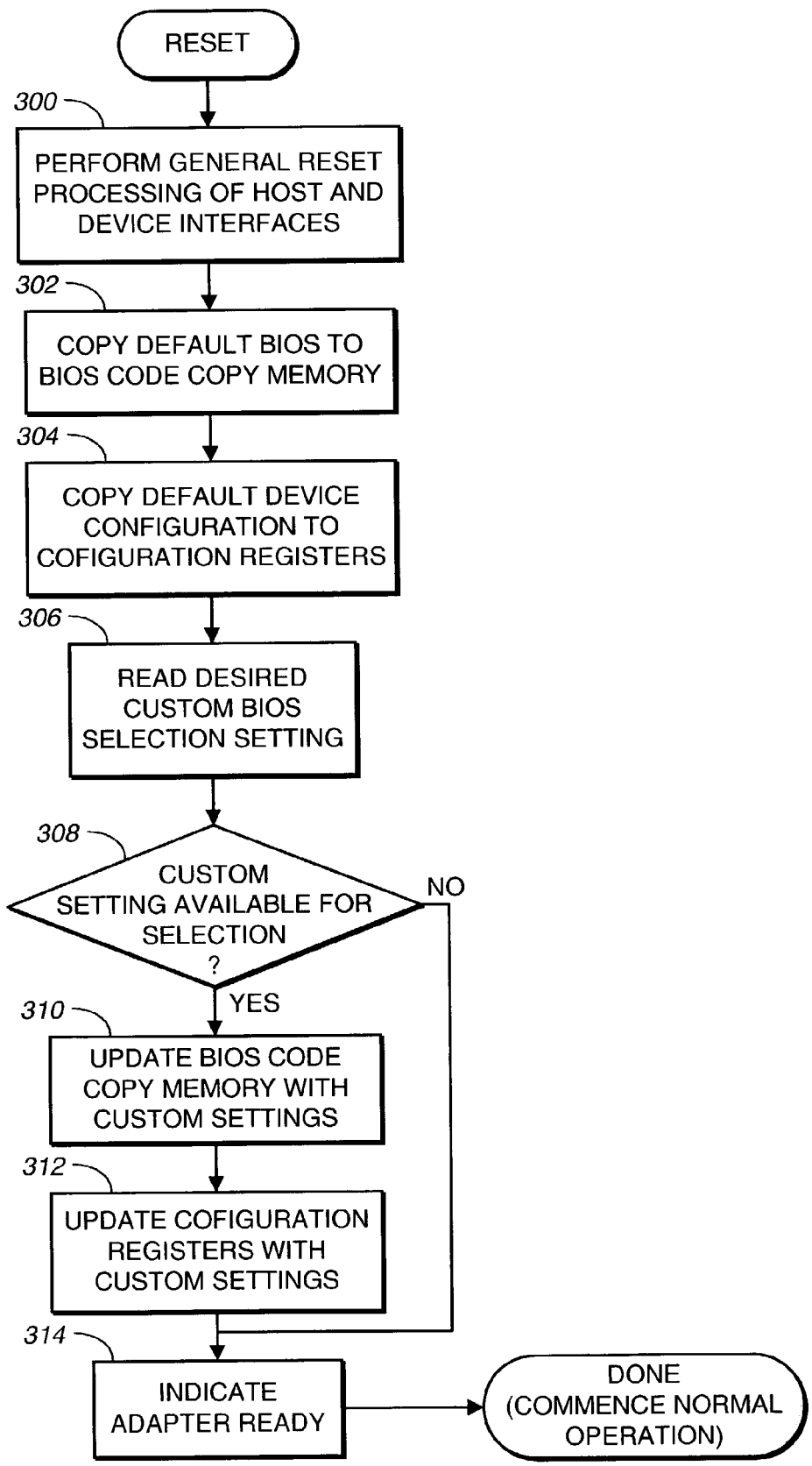
FIG._3

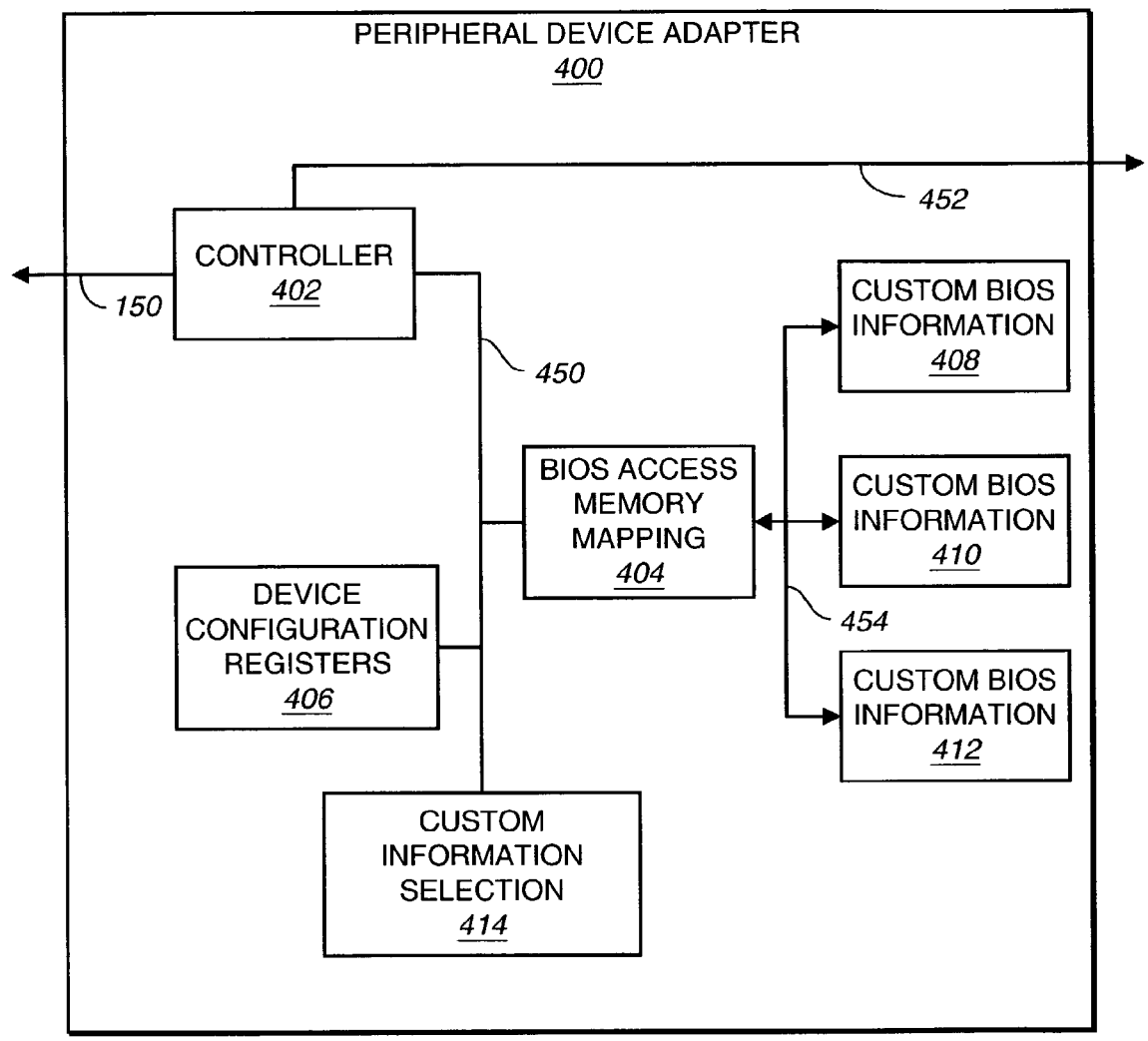
FIG._4

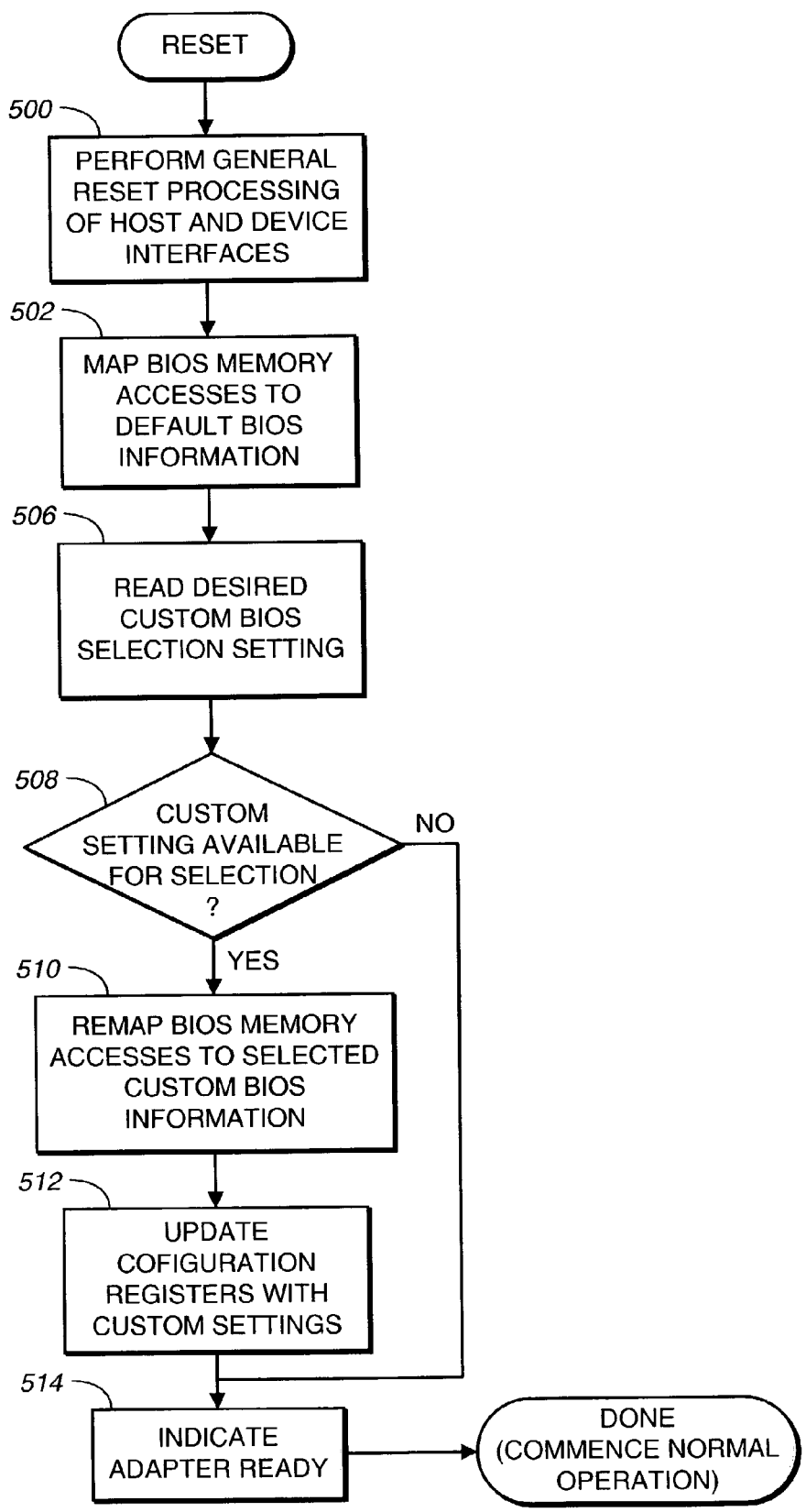
FIG._5

METHODS AND STRUCTURE FOR BIOS RECONFIGURATION

BACKGROUND OF THE INVENTION

1. Field of the Invention

The present intention relates to BIOS memory and more specifically relates to methods and structures for permitting dynamic customization of BIOS information.

2. Discussion of Related Art

Most present-day computer systems, such as personal computers and workstations, includes a main processor coupled to a variety of peripheral device adapters for exchange of information with peripheral devices such as disk drives, tape drives, display monitors etc. The peripheral device adapters generally adapt signals provided by the main processor to application to a peripheral device. a system bus couples the peripheral device adapters to the main processor (often through other interface component). The peripheral device adapter, in turn, couples to appropriate signals for the peripheral device.

In general, such present computer systems typically include BIOS information including program instructions executed by the main processor upon system reset or power up. A principal function of such BIOS program instructions is to startup the computing system in an orderly manner often referred to as "boot up."

It is also generally known that peripheral device adapters include BIOS information accessed by the system main processor during the boot up process as well as, potentially, during normal operation of the computer system. The BIOS information contained within such peripheral device adapters includes header information that may be used to identify the particular peripheral device adapter and/or parameters thereof as well as program instructions unique to the initialization, control and operation of the respective peripheral device adapter.

Manufacturers of such peripheral device adapters often design and manufacture a related family of products that differ in relatively minor respects as regards the design and operation of BIOS program instructions required to operate each member of the family. Similarly, manufacturers of such peripheral device adapters may provide customized versions of a particular adapter for each of a plurality of customers. In such circumstances, the manufacturer may generate and maintain a plurality of versions of BIOS information. For example, BIOS information for each member of a family of related products may differ only in that the device identification information contained in a header portion of the BIOS information may reflect a different device ID. Or, similarly, where a manufacturer produces a variety of peripheral device adapters customized only in that different customers may have unique branding requirements, multiple versions of the BIOS information may be generated and maintained by the manufacturer where the only difference is a vendor ID code included in the header information. Still further, particular customers of a manufacturer may desire unique customized features in the startup initialization, control or normal operation of a peripheral device adapter. In such circumstances, the manufacturer may again produce multiple versions of the BIOS program instructions associated with each customized version of the peripheral device adapter.

As presently known in the art, BIOS information is usually stored in read only memory devices (or in flash memory devices) accessible by the peripheral device adapter and the host system processor. Therefore, present practices requires that a manufacturer of peripheral device adapter components generate and maintain a plurality of BIOS information images despite the fact that they may differ in only minor, insignificant respects. Maintaining such multiple versions imposes overhead logistic complexities and costs on manufacturers of peripheral device adapters. Such logistic complexities may also tend to induce errors as updates may be applied to certain versions but not other versions where multiple versions of BIOS images need be maintained.

It is evident from the above discussion that a need exists for a peripheral device adapter architecture that improves the ability of a peripheral device adapter manufacturer to generate and maintain a minimal number of versions of BIOS information for closely related peripheral device adapters.

SUMMARY OF THE INVENTION

The present intention solves the above and other problems, thereby advancing the state of the useful arts, by providing methods and associated structure for dynamically customizing a peripheral device adapter's BIOS information during power on or reset initialization of the adapter. In general, the present invention provides for methods and associated structure to update BIOS information within the device adapter by selecting one of a number of customized portions of BIOS information in response to sensing a desired selection during power up or reset initialization of the adapter.

One feature of the invention provides a device adapter comprising: a writable BIOS memory; a BIOS custom information memory; and a controller communicatively coupled with the writable BIOS memory and with the BIOS custom information memory and operable to update the writable BIOS memory in accordance with information in the BIOS custom information memory.

Another aspect of the invention further provides for a BIOS ROM memory communicatively coupled with the controller, such that the controller is operable to copy information from the BIOS ROM memory to the writable BIOS memory prior to updating the writable BIOS memory.

Another aspect of the invention further provides that the BIOS custom information memory further comprises: a plurality of custom BIOS settings, such that the controller is operable to select a desired configuration from the plurality of custom BIOS setting and is further operable to use the desired configuration to update the writable BIOS memory.

Another aspect of the invention further provides a selection indicator coupled to the controller, such that the controller is operable to select the desired configuration in accord with the selection indicator.

Another aspect of the invention further provides that the selection indicator comprises: a configuration switch indicating the desired configuration to be selected by the controller.

Another aspect of the invention further provides that each setting of the plurality of custom BIOS settings comprises BIOS header information.

Another aspect of the invention further provides that the BIOS header information includes device ID information.

Another aspect of the invention further provides that the BIOS header information includes vendor ID information.

Another aspect of the invention further provides that each setting of the plurality of custom BIOS settings comprises BIOS program instructions.

Another aspect of the invention further provides that each setting further includes device ID information.

Another aspect of the invention further provides that each setting further includes vendor ID information.

Another feature of the invention provides a system comprising: a processor; and an adapter coupled to the processor such that the adapter comprises: a dynamically customizable BIOS memory accessible by the processor; and a controller communicatively coupled with the dynamically customizable BIOS memory and operable to customize the dynamically customizable BIOS memory prior to access by the processor.

Another feature of the invention provides a method operable in an adapter having a BIOS memory accessible by a processor comprising the steps of: selecting a custom BIOS configuration; and customizing the BIOS memory in accord with the selected custom BIOS configuration prior to permitting access by the processor.

Another aspect of the invention further provides that the step of selecting comprises the step of: sensing a switch setting to identify the selected custom BIOS setting.

Another aspect of the invention further provides that the BIOS memory is writable and such that the step of customizing comprises the step of: updating BIOS header information in the BIOS memory in accord with the selected custom BIOS configuration.

Another aspect of the invention further provides that the BIOS memory is writable and such that the step of customizing comprises the step of: updating BIOS program instructions in the BIOS memory in accord with the selected custom BIOS configuration.

Another aspect of the invention further provides that the BIOS memory is writable and such that the step of customizing comprises the steps of: copying default BIOS information from another memory into the BIOS memory; and updating BIOS header information in the BIOS memory in accord with the selected custom BIOS configuration.

Another aspect of the invention further provides that the BIOS memory is writable and such that the step of customizing comprises the steps of: copying default BIOS information from another memory into the BIOS memory; and updating BIOS program instructions in the BIOS memory in accord with the selected custom BIOS configuration.

Another aspect of the invention further provides that the adapter includes BIOS memory mapping components to map addresses associated with accesses to the BIOS memory by the processor and such that the step of customizing comprises the step of: updating the BIOS memory mapping components in accord with the selected custom BIOS configuration.

BRIEF DESCRIPTION OF THE DRAWINGS

FIG. 1 is a block diagram of a typical computer system having peripheral device adapters with unique BIOS information as presently practiced in the art.

FIG. 2 is a block diagram of one exemplary embodiment of an improved peripheral device adapter in accordance with the present invention.

FIG. 3 is a flowchart describing a process of the present invention for customizing configuration of BIOS information in a device adapter.

FIG. 4 is a block diagram of another exemplary embodiment of an improved peripheral device adapter in accordance with the present invention.

FIG. 5 is a flowchart describing a process of the present invention for customizing BIOS information in a device adapter.

DETAILED DESCRIPTION OF THE PREFERRED EMBODIMENTS

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 is a block diagram depicting a computer system 100 having a plurality of peripheral device adapters 110 and 114 each having unique BIOS information 112 and 116, respectively. Computer system 100 may include a main processor 102 coupled to main memory 104 and peripheral interface 108 via processor bus 152. Main memory 104 may be used by main processor 102 for storage and retrieval of program instructions and related data. Main memory 104 may be any of several well-known, readily available memory components including, for example, DRAM, SDRAM, ROM, flash memory, etc. Processor bus 152 may be any appropriate bus structure suitable for use in coupling main processor 102 to main memory 104 and peripheral interface 108. Peripheral interface 108 adapts signals exchanged over processor bus 152 for exchange with devices coupled to a system bus 150. System bus 150 may be any of several well-known system buses including, for example, PCI.

One or more peripheral device adapters 110 and 114 may be coupled to system bus 150 to enable system 100 through processor 102 to exchange information via system bus 150 with peripheral devices (not shown). Examples of such peripheral devices may include, magnetic disk drives, optical disk drives, tape backup storage devices, display monitors, user input devices such as keyboards and pointer devices, etc.

Each peripheral device adapter 110 and 114 may include its own unique BIOS information 112 and 116, respectively. BIOS information may include, for example, header information that may identify the particular device adapter and/or peripheral devices (not shown) coupled to the peripheral device adapter. BIOS information may also include, for example, program instructions accessible by main processor 102 and useful to provide initialization, configuration and normal operation of the associated peripheral device adapter.

Those of ordinary skill in the art will recognize a wide variety of system architectures, buses, and peripheral device adapters that may represent equivalent system architectures. FIG. 1 is therefore merely intended as representative of a typical computer system 100 as generally known in the art. In particular, peripheral device adapters 110 and 114 may be, for example, SCSI interface adapters, Fibre Channel interface adapters, network adapters, display monitor adapters, USB adapters, Firewire adapters, etc.

As discussed above, a problem arises where a manufacturer produces a peripheral device adapter that must be customized for each of a plurality of customers or where a family of peripheral device adapters are closely related but require minor modifications in the otherwise common BIOS information. As further noted above, such customization may include customized device ID information, customized vendor ID information, customized program instructions to provide customized features, etc. A problem arises in that such a manufacturer must maintain multiple versions all BIOS information complete with all associated information and program instructions. The multiple versions may differ in only minor respects (such as unique device IDs or unique vendor IDs) but nonetheless impose an administrative and logistic overhead on such a manufacturer. The logistic complexities of maintaining such multiple copies may lead to errors in updating particular versions but neglecting to update other essentially identical versions.

The present invention solves this and other problems by providing an improved peripheral device adapter and system architecture to permit dynamic customization of BIOS information associated with a peripheral device adapter. Such dynamic customization processes and structures permits a manufacturer to reduce the administrative complexities associated with maintaining essentially duplicative versions of BIOS information. Rather, processes and structures of the present invention allow for common elements to be maintained in a single version while customized elements may be integrated with the common base elements dynamically during peripheral device adapter initialization (i.e. during power up or reset processing of the adapter).

FIG. 2 is a block diagram of one exemplary embodiment of a peripheral device adapter in accordance with the present invention. Peripheral device adapter 200 includes controller 202 to provide any required host system interaction via peripheral bus 150 as well as interaction with any peripheral device (not shown) coupled to adapter 200 via peripheral interface bus 252. Controller 202 may be any general or special-purpose processor suitably programmed to execute instructions for desired peripheral control and host communications. Program instructions executed by such a programmable controller 202 may be stored in any suitable memory device (not shown) or even integrated within the integrated circuits that may comprise such a general or special-purpose processor (i.e., a microcontroller). Further, controller 202 may be a standard integrated circuit commercially available for such control functions or may be a custom-designed circuit for desired control and communication functions.

Controller 202 is coupled to other elements of the peripheral device adapter 200 via bus 250. Bus 250 may be any of several standard commercially available bus structures or may be customized for the intended purposes. BIOS code copy element 204 is coupled to controller 202 via bus 250 and may contain BIOS program information intended for operation of and execution by the host system processor. Depending upon particular host interface bus selection (i.e., bus 150) particular bus configurations may be read from or programmed into device configuration registers 206 by operation of the host system main processor with cooperation of controller 202.

BIOS code copy 204 may be, for example, a nonvolatile memory device that may be reprogrammed by operation of controller 202 (i.e., nonvolatile memory or flash memory). In the alternative, BIOS code copy 204 may be a standard DRAM or static RAM device wherein the copy of a default set of BIOS program instructions and data may be entered during initialization and reset processing of the peripheral device adapter 200. Such default instructions and data may be copied to BIOS code copy 204 by operation of controller 202. Further, such default BIOS instructions and data may be stored within a read-only memory associated with peripheral device adapter 200. Such a read-only memory may be contained within controller 202 or may be incorporated within peripheral device adapter 200 as an additional component (not shown) coupled to bus 250.

As noted above, prior peripheral device adapter solutions included a single static BIOS code copy for access by a host system processor. Such a memory may have consisted of a read-only memory or a flash memory but was nonetheless intended to include a single static snapshot of BIOS program instructions and associated data. By contrast, peripheral device adapter 200 in accordance with the present invention customizes the contents of BIOS code copy 204 during initialization processing under control of controller 202. One or more custom BIOS information elements 208, 210 and 212 may be coupled to controller 202 via bus 250. During initialization processing within peripheral device adapter 200 under control of controller 202, one of the custom BIOS information elements (208 . . . 212) may be accessed by controller 202 to provide custom information used for customizing the contents of BIOS code copy 204. Such custom information may include, for example, a customized device ID, a customized vendor ID, customized features within BIOS program instructions, etc.

Controller 202 selects one of the one custom BIOS information elements 208 through 212 and updates the BIOS code and data in BIOS code copy 204 as required. Custom information selection element 214 provides indicia for use by controller 202 in determining which of the custom BIOS information elements to select. For example, custom information selection element 214 may comprise one or more switches. The switch settings may be sensed by controller 202 via bus 250 to identify a selected custom BIOS information element. Further, selection element 214 may comprise jumpers configurable by the manufacturer of peripheral device adapter 200 or reconfigurable by technically skilled users to identify a desired selection for custom BIOS information to be incorporated into BIOS code copy 204. Those of ordinary skill in the art will recognize a variety of equivalent elements useful for identifying a desired customization selection to be provided by element 214 and sensed by controller 202.

The process of customizing BIOS code copy 204 may include merely updating particular data elements within BIOS code copy 204 and updating corresponding checksums or error correction codes associated with the contents of BIOS code copy 204. In the alternative, the updating process may include copying a complete snapshot image of all associated code and data stored in a selected custom BIOS information element 208 through 212. Further, the update process may involve first copying a default set of program instructions and data into BIOS code copy 204 and then updating that default information with data and/or instructions stored in a selected custom BIOS information element 208 through 212. In the alternative, a custom BIOS information element 208 through 212 may be designated as a default where no selection is indicated by custom information selection element 214. Those of ordinary skill in the art will recognize a variety of structures and associated processes involved in the updating of BIOS code copy 204 and the selection of default information from among custom BIOS information from elements 208 through 212. Further, those of ordinary skill in the art will recognize that any number of custom BIOS information elements may be provided as required by a particular application of the present invention.

FIG. 3 is a flowchart describing a process of the present invention operable to initialize a peripheral device adapter such as peripheral device adapter 200 of FIG. 2. Element 300 is first operable to perform general reset processing of the host and device interface features of the peripheral device adapter. Such reset processing may involve any processing appropriate to the host interface and peripheral device coupled to the peripheral device adapter. In particular the processing of element 300 and will take appropriate measures to assure that the host system processor cannot yet access BIOS information from the peripheral device adapter until subsequent steps appropriately customize the BIOS information.

Element 302 is next operable to copy default BIOS information into the BIOS code copy memory. As noted above, in one embodiment, default BIOS information may be stored in a read-only memory device (or flash memory device) and copied to a standard RAM memory element as part of initialization processing. In the alternative, where default BIOS information is preprogrammed into a rewritable memory element (i.e., nonvolatile memory or flash memory), processing of element 302 may be skipped. In like manner, element 304 is operable to copy default device configuration information into configuration registers 304. As noted above, certain host interface bus standards (such as PCI) presume particular addressable registers within the peripheral device adapter. Such registers may be read and or written to establish certain default configuration information. Element 304 therefore provides default information expected for the particular host interface bus standard.

Element 306 is next operable to determine a desired selection for custom BIOS information. As noted above, the peripheral device adapter in accordance with the present invention may include one or more custom BIOS information elements, each storing custom information required to customize the peripheral device adapter for a particular environment. As noted above, the custom information may include information such as device ID information, vendor ID information, custom BIOS program instructions for particular custom features, etc. Element 306 therefore determines which custom information element should be selected for customization of the default BIOS information generated by operation of elements 302 and 304 (or otherwise preprogrammed as default BIOS information).

As noted above, operation of element 306 may include reading or otherwise sensing a selection indicia such as switches and or jumpers or other switchable indicia configured at time of manufacturer or customized by appropriately skilled technicians to identify a desired customized configuration for the peripheral device adapter. Having so sensed the desired selection for customizing the BIOS information, element 308 next determines if any customization has been selected. If not, element 314 is next operable as discussed below to complete initialization of the peripheral device adapter and to commence normal operation of the adapter. The selection indicia may indicate no required customization identified or selected by a particular state of the customization selection information elements. For example a particular switch or jumper setting, or lack of any switch or jumper settings, may identify that no customization is required and normal operation may commence.

If element 308 determines that a custom information selection setting has been sensed, element 310 is next operable to update the BIOS information using the customization information in the selected custom BIOS information element. As noted above, the update process may include updating particular variables or header information associated with the BIOS information and or update of program instructions to provide modified or customized features in the BIOS program instructions. The update process may also entail updating individual elements or updating the entire BIOS information storage element. The update process of element 310 also includes updating as necessary any associated checksum or error correction and detection information associated with the BIOS information. Element 312 is similarly operable to update configuration registers with any custom settings indicated by the selected custom BIOS information. As noted above, configuration registers may be associated with a particular selected host bus structure to indicate particular identification information and or default configuration information associated with the peripheral device adapter. Such information in the configuration registers may also be customized in accordance with selected customization information.

Element 314 is then operable to indicate the readiness of the peripheral device adapter for normal operation thereby allowing an associated host system processor to access information and program instructions associated with the BIOS information. Initialization of the peripheral device adapter is thereby completed and normal operation may commence. The host system main processor may then access the customized BIOS information or otherwise manipulate the peripheral device adapter has customized by this process.

FIG. 4 is a block diagram of another embodiment of a peripheral device adapter 400 in accordance with the present invention. Peripheral device adapter 400 is generally similar to peripheral device 200 of FIG. 2 except that memory mapping features are utilized to select a desired customized BIOS rather than copying or updating information within a rewriteable copy of the default BIOS memory. Controller 402 is similar to controller 202 of FIG. 2 and provides overall control of the peripheral device adapter including, in particular, host system interaction via bus 150 and peripheral device interaction via peripheral bus 452. Controller 402 communicates with other elements within peripheral device adapter 400 via bus 450. Device configuration registers 406 are similar to device configuration registers 206 of FIG. 2 and contain standard registers accessible by a host system processor via host interface bus 150. Various standard host interface buses such as PCI define particular configuration registers that may be read and/or written by the host system processor to establish particular configuration options of the peripheral device adapter. Custom information selection element 414 is similar to element 214 of FIG. 2 and provides a means for indicating a selected customized configuration of peripheral device adapter 400.

Peripheral device adapter 400 includes memory mapping means that permit addresses to be mapped to alternative addresses. In particular, host system supplied addresses for BIOS access are mapped to corresponding locations in a selected customized BIOS information 408 through 412. Such memory mapping means are well-known and often comprise logic that compares supplied logical addresses and translates them to physical addresses. Sets of registers often identify logical address ranges to be mapped (as supplied by a host system processor) and a corresponding alternate base physical address for the block of logical addresses identified to be mapped. Those of ordinary skill in the art will recognize a variety of well-known techniques for providing such memory mapping including standard, commercially available components for such mapping features, custom circuit designs for such mapping features, and mapping features integrated within standard available microcontrollers such as controller 402. Processes associated with peripheral device adapter 400 therefore map host processor generated accesses to BIOS memory to one of the customized BIOS information elements 408 through 412.

As above with respect to FIG. 2, those of ordinary skill in the art will recognize a wide variety of devices and structures that may be used to implement an equivalent peripheral device adapter. In particular, any number of custom BIOS information elements 408 through 412 may be implemented in a particular peripheral device adapter as required for a particular application of the invention. Further, a wide variety of information selection elements 414 may be used as indicia for selecting one of the custom BIOS information elements 408 through 412. In addition, one of the custom BIOS information elements 408 through 412 may be designated as a default configuration where custom information selection element 414 indicates such a default selection or indicates no custom selection is to be applied.

FIG. 5 is a flowchart describing a process operable within a peripheral device adapter such as peripheral device adapter 400 of FIG. 4. Element 500 is first operable to perform general reset processing of the peripheral device adapter as required for interfacing to an attached host system and an attached peripheral device. As discussed above with respect to element 300 of FIG. 3, general reset processing of element 500 includes any processing appropriate to the particular device adapter and the particular host interface bus including, for example, precluding the host system processor from accessing BIOS information until appropriate customization has been performed as discussed herein below. Element 502 is then operable to initialize the memory mapping feature for BIOS access to map to a default BIOS information element. Element 506 is next operable to read or otherwise sense the desired custom BIOS selection. As indicated above with respect to element 414 of FIG. 4, a means for indicating a customized selection may include switches and or jumpers configured at the time of manufacture of the peripheral device adapter or otherwise reconfigured by appropriately skilled technical staff to indicate the desired customization of the peripheral device adapter. Having thus sensed the customization selection, element 508 is operable to determine whether any customization is required in accordance with the sensed selection. Where no customization is required (i.e., the default configuration is selected) element 514 is operable to complete initialization of the peripheral device adapter thereby enabling normal operation of the peripheral device adapter. If element 508 determines that a custom selection was sensed by operation 506, element 510 is operable to remap BIOS memory accesses to utilize the selected custom BIOS information. As noted above, such remapping may include, for example, programming of memory mapping registers as required to utilize the selected custom BIOS information. Element 512 is next operable to update configuration information registers as appropriate for the selected custom BIOS information. As noted above, configuration registers may be associated with particular host system buses such as PCI. Element 514 is then operable to indicate readiness of the peripheral device adapter for normal operation under control of the host system. In particular, element 514 enables access to the customized BIOS information by the host system processor.

Those of ordinary skill in the art will recognize a wide variety of equivalent structures and processes to provide a peripheral device adapter with customizable BIOS information. As noted above, the customized BIOS information may include header data such as device ID and/or vendor ID as well as customized BIOS program instructions to provide modified or customized operation of the peripheral device adapter. Such customizable BIOS features allow a single peripheral device adapter to support multiple customized versions of BIOS information without imposing logistic complexities on the manufacturer and designer of such a peripheral device adapter. Rather, a single version of common BIOS information may be maintained and individual customized portions of data and or instructions may be dynamically selected by operation of the peripheral device adapter.

While the invention has been illustrated and described in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A device adapter having a BIOS comprising:
   a plurality of BIOS configurations stored within the device adapter;
   a selection indicator within the device adapter;
   control means within the device adapter communicatively coupled to said selection indicator and to said plurality of BIOS configurations for dynamically configuring said BIOS in accord with information from said selection indicator,
   BIOS memory mapping means within the device adapter for mapping memory addresses associated with BIOS accesses,
   wherein each configuration of said plurality of BIOS configurations comprises custom BIOS program instructions, and
   wherein said control means includes:
   means for updating said BIOS memory mapping means in accord with a selected said custom BIOS program instructions such that BIOS accesses are redirected to corresponding locations in the selected custom BIOS program instructions.

2. The device adapter of claim 1 further comprising:
   a writable BIOS memory within the device adapter,
   wherein each configuration of said plurality of BIOS configurations comprises custom BIOS header information, and
   wherein said control means includes:
   means for updating header information in said writable BIOS memory in accord with a selected said custom BIOS header information.

3. The device adapter of claim 1 further comprising:
   a writable BIOS memory within the device adapter,
   wherein each configuration of said plurality of BIOS configurations comprises custom BIOS program instructions, and
   wherein said control means includes:
   means for updating program instructions in said writable BIOS memory in accord with a selected said custom BIOS program instructions.

4. A method operable in an adapter having a BIOS memory accessible by a processor comprising the steps of:
   selecting, within the adapter, a custom BIOS configuration; and
   customizing, within the adapter, said BIOS memory in accord with the selected custom BIOS configuration prior to permitting access by said processor wherein the customizing is performed within the adapter based on information derived within the adapter,
   wherein said adapter includes BIOS memory mapping components to map addresses associated with accesses to said BIOS memory by said processor and wherein the step of customizing comprises the step of:
   updating said BIOS memory mapping components in accord with the selected custom BIOS configuration.

5. The method of claim 4 wherein the step of selecting comprises the step of:
   sensing a switch setting to identify the selected custom BIOS setting.

6. The method of claim 4 wherein said BIOS memory is writable and wherein the step of customizing comprises the step of:
   updating BIOS header information in said BIOS memory in accord with the selected custom BIOS configuration.

7. The method of claim 4 wherein said BIOS memory is writable and wherein the step of customizing comprises the step of:
   updating BIOS program instructions in said BIOS memory in accord with the selected custom BIOS configuration.

8. The method of claim 4 wherein said BIOS memory is writable and wherein the step of customizing comprises the steps of:
   copying default BIOS information from another memory into said BIOS memory; and
   updating BIOS header information in said BIOS memory in accord with the selected custom BIOS configuration.

9. The method of claim 4 wherein said BIOS memory is writable and wherein the step of customizing comprises the steps of:
   copying default BIOS information from another memory into said BIOS memory; and
   updating BIOS program instructions in said BIOS memory in accord with the selected custom BIOS configuration.

* * * * *